Oct. 24, 1944.  L. H. BROWN  2,361,347
STEREOSCOPIC PICTURE AND METHOD OF MAKING THE SAME
Filed Sept. 1, 1942
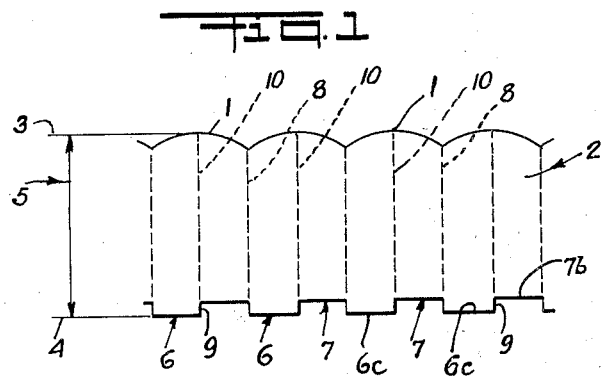
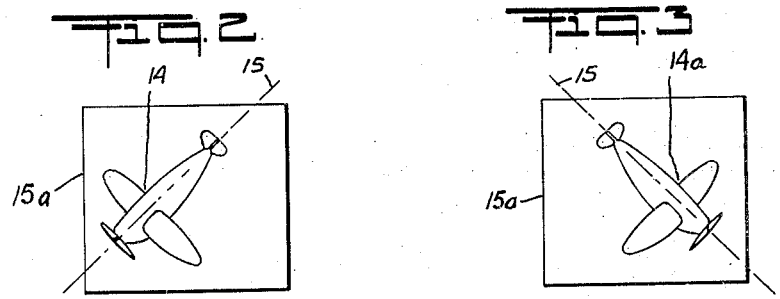
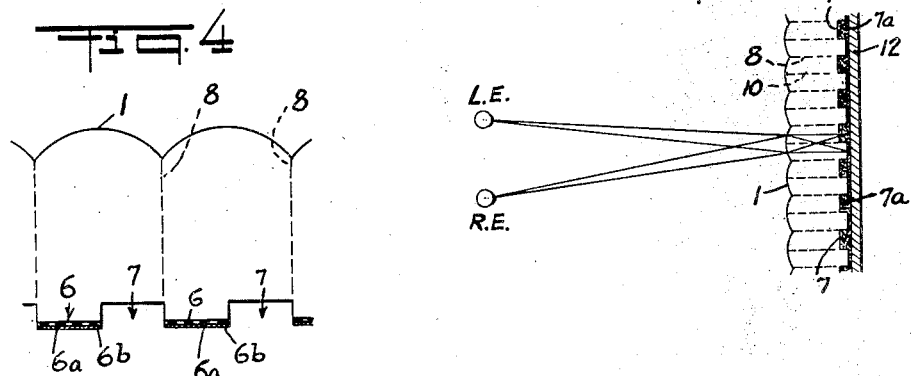
INVENTOR.
Leo H. Brown
BY Mock & Blum
ATTORNEYS Patented Oct. 24, 1944

2,361,347

UNITED STATES PATENT OFFICE 2,361,347

STEREOSCOPIC PICTURE AND METHOD OF MAKING THE SAME

Leo H. Brown, Glenville, Conn.

Application September 1, 1942, Serial No. 456,854

11 Claims. (Cl. 88—1)

My invention relates to a new and improved stereoscopic picture and a new and improved method of making the same.

One of the objects of my invention is to provide a lenticulated film or other lenticulated device, in which the non-lenticulated face of said film is shaped or otherwise modified to facilitate the reproduction thereon of one or more stereoscopic pictures. For convenience, the non-lenticulated face of the film or other lenticulated object is designated as the rear face thereof.

Another object of my invention is to combine the lenticulated film with a supplemental carrier, one of said stereoscopic pictures being reproduced upon the rear face of the lenticulated film, the other picture being reproduced upon said supplemental carrier.

Another object of my invention is to provide a stereoscopic picture of the type which can be readily viewed by reflected light, so that the stereoscopic picture is opaque and it can be readily bound into books and the like.

Numerous additional objects of the invention will be stated in the annexed description and drawing which illustrate a preferred embodiment thereof.

Fig. 1 is a diagrammatic elevation of the improved film.

Fig. 2 and Fig. 3 respectively illustrate two positions of the same stereoscopic picture of the same subject. One of said positions is inverted relative to the other position, from right to left. That is, if Fig. 2 were drawn on a sheet of transparent paper, and if said transparent sheet were turned 180° around the edge 15a as a vertical axis, and if Fig. 2 were then viewed from the back of said transparent sheet, such view would be a duplicate of Fig. 3.

Fig. 4 is a diagrammatic view which illustrates the printed or other reproduction of parts of one of the stereoscopic pictures upon a part of the rear surface of the lenticulated film.

Fig. 5 is a diagrammatic view, partially in cross-section, which illustrates the combination of the lenticulated film with a supplemental carrier.

The invention is explained herein with reference to the use of two stereoscopic negatives, which are taken of the same subject at slightly different angles. Such negatives can be taken by means of a stereoscopic camera, or by means of two cameras. Since this is old and well-known per se, the taking of the two separate negatives is not illustrated herein.

The film 2 is made of any suitable light-permeable material, which is preferably transparent. It may be made of methyl methacrylate resin or other transparent plastic or other material, by means of extrusion, rolling, pressing or the like. This material should preferably have a uniform index of refraction. I can use cellulose acetate. In the embodiment specifically illustrated, the lenticulations 1 are portions of cylinders and they are identical in all respects. There may be from 25–300 lenticulations per inch. The maximum thickness 5 of the film 2, which is taken between the lines 3 and 4, is approximately equal to the focal length of each lenticulation 1. Each imaginary line 10 indicates a plane which is perpendicular to the line 3, and which passes through the middle point of a respective lenticulation 1. Each line 10 is therefore the trace of a diametral plane of the respective cylinder of which the lenticulation 1 is a part. The imaginary lines 8 indicate planes which are perpendicular to the parallel lines 3 and 4, and which pass through the junctions between respective lenticulations 1.

The rear face of film 2 is provided with ribs 6, which are separated by depressions 7, which have walls 9. Said walls 9 are designated as transverse walls. In each depression 7, one planar wall 9 is coincident with the plane of line 10, and the other wall 9 is planar and coincident with the plane of a line 8. The ribs 6 and depressions 7 are therefore of equal width, which is equal to one-half the width of a lenticulation 1. The faces 6b of ribs 6 are in the same plane, said plane passing through line 4, and being perpendicular to the plane of Fig. 1, and being parallel to the corresponding plane which passes through line 3, and which is tangent to the respective lenticulations 1 at their respective central points.

While one or both of the stereoscopic pictures can be reproduced by any method upon the rear surface of film 2, I prefer to use a printing method. This method can be continuous-tone, half-tone, gravure, offset, lithographic, with the use of rigid or resilient printing plates or blankets or rolls, etc.

For example, respective half-tone printing plates of the two negatives can be used. One of these printing plates is used for printing parts of a duplicate of the respective picture, only upon the planar rear faces 6c of the ribs 6. For convenience, the picture whose separated parts are printed upon faces 6c is designated as the first picture. Said first picture will thus be printed in the form of narrow spaced picture strips or areas 6a, each adjacent pair of picture strips being separated by a missing area. Said strips and said missing areas will be of equal width. This printing can be performed in mono-color by black ink or ink of any color, or it may be in multi-color. The printed strips 6a are then overprinted or overlaid with coating strips 6b. Said strips 6b are opaque and reflecting. For this purpose, I can use any printing or coating composition which contains finely divided aluminum, bronze, clay, etc., and I can use a continuous printing plate, which will apply the composition of coating strips 6b, only to the strips 6a.

The half-tone plate of the other negative is used for printing a reproduction of the other or second negative on the carrier 12. This carrier 12 is made of opaque and light-reflecting material. It may be made of coated paper, of the kind which is used for printing books and magazines. Said carrier 12 may have a ground layer of a printing composition or coating composition which contains finely divided aluminum, bronze, etc., in order to provide superior opaque and light-reflecting properties. The picture which is printed on carrier 12 is preferably a complete reproduction of the respective or second negative, instead of the partial strip reproduction of the first negative which is printed upon the faces 6c.

Film 2 is now cemented by adhesive 7a or it is otherwise affixed to carrier 12. For this purpose, I can use an adhesive which is transparent and which has the same index of refraction as the material of film 2. If an adhesive 7a is used, it is preferably applied only in recesses 7 and the adhesive 7a preferably fills said recesses, so that each coating strip 6b abuts or substantially abuts the second picture on carrier 12. Hence the portions of the second picture which abuts the covering strips 6b, are preferably free from adhesive, although there may be adhesive between covering strips 6b and the inner face of carrier 12.

In Fig. 5, the position of the left-eye of the observer is designated as "L. E." and the position of the right-eye of the observer is designated as "R. E." The right eye can view only the portions of the second picture on carrier 12, which register with the depressions 7. The left eye views only the strips of the picture which have been printed on the planar faces 6c.

Hence in this embodiment, strips of the original left-eye negative or the picture thereof, are reproduced upon the faces 6c. The right-eye negative or the picture thereof, is reproduced upon carrier 12, preferably in continuous form, that is, without any missing strips or areas. The left-eye picture on the faces of 6c is therefore viewed in inverted position, whereas the right-eye picture on carrier 12 is not viewed in inverted position.

In order to make allowance for this inversion of the left-eye picture, the printing plate which is used in printing upon the faces 6c. prints an inverted duplicate of the respective left-eye picture, the inversion being from right to left. If Fig. 2 is a duplicate of the original left-eye picture, the plate which is used to print strips 6a, is of the type which prints the picture of Fig. 3, whose relation to the picture of Fig. 2 has been stated, so that the left-hand vertical edge of the picture of Fig. 2, is the right-hand vertical edge of the picture of Fig. 3, and all other parts of the picture of Fig. 3 are given this left-right inversion.

If carrier 12 is bound as the page of a book, so that the binding of the book is at the left-hand of the observer when the composite stereoscopic picture is viewed, the original left-hand edge 16a of the original left-hand picture of Fig. 2, will be adjacent the free or unbound right-hand edge of said page. The line 16 of Fig. 2 indicates the longitudinal axis of the original left-eye picture, and the point 14 of said original picture is the point 14a in the inverted left-right picture which is shown in Fig. 3.

If the picture is wide, the depressions 7 at the left-hand lenticulations 1 can be displaced increasingly to the left of the position which is shown in Fig. 1, relative to the respective planes of the respective lines 10, said planes being perpendicular to the plane of Fig. 1. The depression 7 at the extreme left-hand lenticulation 1 will have the greatest displacement to the left, relative to the plane of line 10. Such displacement to the left of depressions 7, from the position of Fig. 1, can be equal in a series of the lenticulations which are located at and adjacent the left-hand edge of film 2. In such case, said plane of line 10, which is perpendicular to the plane of Fig. 1, will pass between the walls 9 of the respective displaced depression 7. The distance between the left-hand wall 9 of a depression 7 and the respective plane of line 10, in a depression 7 which has thus been displaced to the left, will be less than the distance between said plane and the right-hand wall 9 of the respective depression 7. In such case, the depressions 7 of the right-hand lenticulations will be correspondingly displaced to the right of the position shown in Fig. 1, so that each of the lenticulations at and adjacent the left-hand edge of film 2, in which a depression 7 has been displaced to the left, will be matched by a companion displaced depression 7 at and adjacent the right-hand edge of film 2.

In such a film, the median zone of the film will have the depressions located in the manner shown in Fig. 1, in more than 50% of the width of the film. The width of the film, in a page of a bound book, is the dimension which is perpendicular to the line of binding.

One of the great advantages of my invention is to provide clear and accurate stereoscopic reproduction, even if the partial first picture on the faces 6c of the film 2, and the second picture on the page or other carrier 12 are not in accurate registration along their widths. In such case, the left-hand edge of the picture on faces 6c may be either to the left or to the right of the left-hand edge of the picture on carrier 12. This result is secured, because a complete picture can be printed on carrier 12, and because the opaque strips 6b block corresponding respective areas of said complete picture on carrier 12. More care is required in securing accurate registration of the two pictures along their heights.

Since the faces 6c are in fixed position relative to the lenticulations 1, absolutely accurate registration is produced between the separated strips or areas of the picture on faces 6c, and said lenticulations 1. If the film 2 is made of pyroxylin, or cellulose acetate or the like, its shape and dimensions may change, due to heat and moisture and other causes, while the change may be less or different in the carrier 12, if said carrier is made of paper. Since accurate registration in the direction of the width is not required, this is a very important advantage if there is a relative change in shape or dimensions between the members 2 and 12, before or after they are connected to each other.

The picture of one negative can be printed upon the faces 6c and the picture of the other negative can be printed upon the walls 7b of depressions 7. The depth of depressions 7 can be very slight, so that both pictures will be accurately seen by reflected light through the lenticulations 1. The method of printing one of the pictures on walls 7b can be the same as that previously described, including the use of opaque and light-reflecting backing material 6b. In order to print on the walls 7b, I can use offset printing, or a printing member which is made of vulcanized rubber or other resilient material.

Each printing plate can thus be of the continuous type which can print a continuous picture, free from missing strips or areas, if such printing plate were applied throughout to a sheet of paper. When such a continuous plate is used for printing on faces 6c, the film 2 is sufficiently firm to cause said plate to contact with the rear surface of film 2, only at faces 6c. The plate which is used for printing on faces 6c is preferably rigid, but it may be yieldable, if it is sufficiently rigid to print only on faces 6c.

If the picture strips 6a are covered with opaque coatings 6b, the second plate, which is preferably somewhat yieldable or resilient in order to enter depressions 7 and to print on walls 7b, will also print on opaque coatings 6b. However, the printing on said coatings 6b will be invisible when the assembled pictures on the rear surface of film 2 are viewed by reflected light, in the manner illustrated in Fig. 4.

The formulas for inks and other compositions which can be used for printing or otherwise marking pyroxylin, cellulose acetate, glass, etc. are well-known.

I can use different types of inks for printing on the surfaces 6c and 7b, if both pictures are to be located upon the same carrier 2. I can use inks, one of which can be removed by a solvent to which the other ink is inert. Hence, if I wish to produce a transparency of two assembled pictures on the surfaces 6c and 7b, I can first print one picture only on the surfaces 6c with one ink, then print the second picture on surfaces 6c and 7b with a second ink, and remove the second markings from the faces 6c, leaving the original markings 6a on the surfaces 6c. The opaque blocking material of the coatings 6b is thus eliminated, so that the assembled pictures can be viewed by transmitted light, instead of by reflected light. It is also well known in the art of printing, to prevent the application of ink to any part of a surface, by coating said part with a material to which the ink will not adhere, as in lithography. Hence, after I print the strips 6a, I can temporarily cover said strips 6a with any removable protective material, so that the second printing plate will apply its ink only to the walls 7b. The protective material can then be removed.

In one aspect of the invention, the rear face of film or carrier 2 may be planar instead of being ribbed.

The film 2 may be formed by pressure, by means of a die and a platen. Said die shapes the lenticulations 1. The platen may be planar, save that it has depressed or gravure areas which can print areas on the rear face of film 2, corresponding either to areas 6c or areas 7b. The composition thus used is of the type to which the ink will not adhere. The first plate will then print one picture only on the series of areas 6c, or only on the series of areas 7b. The protective or resist composition is then removed. If the opaque coatings 6b are applied, the second plate can be used in the ordinary manner, because overprinting on the coatings 6b will be invisible by reflected light. If the coatings 6b are not used, the protective composition is applied to the printed strips 6a, before printing the second picture.

The same procedure can be used in printing separated areas on the rear surface of film or carrier 2, instead of providing a ribbed rear surface.

For example, a typical formula of an ink for printing on cellulose acetate is as follows:

|  | Per cent |
|---|---|
| Glycol monoacetate | 85-95 |
| Glycerin | 5-15 |
| Pigment | As desired |

The above proportions are by weight. Glycol monoacetate or ethylene glycol monoacetate is partially soluble in alcohol, ether, benzene, toluene. Glycerin or glycerol is soluble in water and alcohol.

Linseed oil varnish is only slightly soluble in alcohol, and it is soluble in turpentine, amyl acetate, and other solvents in which glycol monoacetate and glycerin are only slightly soluble. Hence linseed oil varnish can be used as a temporary protective material.

I have disclosed a preferred embodiment of my invention, but numerous changes and omissions can be made without departing from its spirit.

For example, the invention is not limited to the use of cylindrical lenticulations, or to the use of rectangular picture-carrying faces 6b, as in the present embodiment. The lenticulations may be of any shape, and the associated picture-carrying areas 6b may be of any corresponding shape. In the specific embodiment disclosed, the picture-carrying areas 6b and the intermediate areas 7b have different surface characteristics, which differentiate the areas 7b from the areas 6b. As previously noted, the areas 7b may be or may not be picture-carrying areas. In the embodiment disclosed herein, said different surface characteristics are structural, because the areas 7b are depressed relative to areas 6b. Any type of differentiating surface characteristic may be used. Likewise, the difference in surface characteristic may be non-structural, either permanent or temporary. For example, if the rear surface of film 2 is planar, and areas 6b and 7b have different coatings or the like, whereby one series of areas can take up a marking composition which the other series of areas cannot take up, this is a different surface characteristic. This difference of surface characteristic is produced upon the rear surface of the film 2, preferably simultaneously with the formation of the lenticulations 1. The invention is not limited to this simultaneous formation of the lenticulations and of the different surface characteristics, because said formation may be successive, in any order. In any event, the rear surface of the film has the plurality of series of areas in fixed relation to the lenticulations, before marking one or more partial pictures upon the rear surface of the film. This eliminates the use of masks or other auxiliary devices. In certain aspects of the invention, it is not limited to a film whose rear surface has two or more series of areas which have different surface characteristics, either structural or non-structural. For example, if one picture is printed or otherwise marked upon the rear surface of film 2 by means of a mask which has a series of slits, or by means of a printing plate which prints only spaced areas of a picture, the combination of Fig. 5 is nevertheless a novel combination which is within the scope of the invention. The invention also applies to the film 2 per se, including an unprinted or unmarked film which has the necessary characteristics. Instead of having only two series of areas on the rear face of film 2, I can provide three or more such series, depending upon the number of original pictures which are to be stereoscopically assembled.

Likewise, the overprinted areas 6b can be eliminated, by marking the areas 6a with an opaque and light-reflecting ink, which will prevent any substantial transmission of light through such markings on areas 6a. Such inks are well-known. They usually contain finely divided metal or alloy, such as aluminum, bronze, etc. If the printed areas 6a are substantially continuous in each said area, this will have the same blocking effect as the overprinted blocking areas 6b.

Each picture area is located accurately or substantially in the focus or in the focal plane of a respective associated lenticulation. The designations focus or focal plane are equivalent, as I can use any type of lenticulation.

Instead of shaping each lenticulation as part of a cylinder, the median part of each lenticulation can be accurately a portion of a cylinder, and the edge portions of each lenticulation can be of less curvature than the median part, in order to correct for spherical aberration.

In this embodiment, adjacent areas 6c are separated by a single area 7b. This relation can also be varied, it being sufficient if adjacent areas of one series are separated by at least one area of another of the two or more series. The axis of each lenticulation in a plane perpendicular to the plane of Fig. 1, is designated as the longitudinal axis thereof. Said longitudinal axes are parallel to each other.

If the faces 7b are to carry consecutive separated areas of a respective picture, said faces 7b are located accurately or substantially in the foci or focal planes of respective lenticulations. Either of the pictures my be inverted left-right or right-left, in producing the composite stereoscopic picture.

The carrier which is shown in Fig. 1 may be made by shaping a single integral piece of material, or by connecting two or more pieces of material. It can be assumed, for example, that the carrier 2 is cut along a median plane which is perpendicular to the line 5, thus providing two planar faces which can be connected to each other.

In the embodiment of Fig. 1, the carrier has a longitudinal axis, which is parallel to the faces 6c. The lenticulations 1 are in longitudinal succession at the lenticulated face of the carrier. At the opposed face of the carrier, there are longitudinal spaced walls 6c, which are separated by intermediate depressions 7. As shown in Fig. 4, said spaced walls 6c have picture areas 6a, of the first picture. Said picture areas 6a are in a continuous spaced longitudinal succession. Each said picture area is located in the focal plane of a respectively transversely alined lenticulation.

I claim:

1. In combination, a first carrier and second carrier, said carriers having respective inner adjacent faces, said carriers being connected to each other, the first carrier being light-permeable, the second carrier being opaque, the first carrier having an outer face which has lenticulations, the foci of said lenticulations being located substantially in said inner face of the second carrier, said inner face of the first carrier having recesses which are spaced from each other, the portions of said inner face of the first carrier which are located between said recesses substantially abutting said inner face of the second carrier, said portions of said inner face of the first carrier having spaced and consecutive picture portions of a left-right inverted first picture located thereon and overlaid with opaque light-reflecting material, the inner face of said second carrier being light-reflecting and having the representation of a second picture thereon, said first picture and said second picture being pictures of the same subject taken at different angles, said picture portions and said second picture being arranged and located to give a stereoscopic view of said subject when said picture portions and said second picture are viewed by light which passes through said first carrier through said lenticulations and which is reflected from the inner face of the second carrier.

2. In combination, a first carrier and a second carrier, said carriers having respective inner adjacent faces and being connected to each other, the outer face of the first carrier having a series of lenticulations, the inner face of the second carrier being substantially planar, the first carrier being light-permeable, the inner face of the first carrier having the reproductions of consecutive spaced areas of a first picture thereon, the inner face of the second carrier having the continuous reproduction of a second picture thereon, said pictures being pictures of the same subject at different angles, said pictures being located substantially in the foci of said lenticulations, one of said pictures being inverted relative to its original left and right edges, said pictures being in sufficient registration to provide a stereoscopic effect when viewed by light which passes through said lenticulations.

3. In combination, a first carrier and a second carrier, said carriers having respective inner adjacent faces and being connected to each other, the outer face of the first carrier having a series of lenticulations, the inner face of the second carrier being substantially planar, the first carrier being light-permeable, the inner face of the first carrier having the reproductions of consecutive spaced areas of a first picture thereon, the inner face of the second carrier having the continuous reproduction of a second picture thereon, said pictures being pictures of the same subject at different angles, said pictures being located substantially in the foci of said lenticulations, one of said pictures being inverted relative to its original left and right edges, said pictures being in sufficient registration to provide a stereoscopic effect when viewed by light which passes through said lenticulations, said second carrier being opaque, said areas of the first picture being light-reflecting and opaque.

4. A method of producing a composite stereoscopic picture with the use of a first picture and a second picture of the same subject at different angles, and with the use of a first light-permeable carrier which has an outer face which has lenticulations and with the use of a second carrier which consists in marking a continuous reproduction of the second picture on the inner face of the second carrier, marking consecutive spaced areas of the second picture on the spaced areas of the inner face of the first carrier, one of said pictures being thus marked with its left and right edges inverted relative to their original positions, and assembling said carriers so that said inner face of the first carrier is adjacent the second carrier and said pictures are substantially in the foci of said lenticulations, said carriers being assembled with their pictures in sufficient registration to produce a composite stereoscopic picture when said pictures are viewed by light which is transmitted through said lenticulations.

5. A method according to claim 4 in which the second carrier is opaque, and the markings on the first carrier are blocked from being viewed by transmitted light.

6. A light-permeable picture carrier which has lenticulations at one face thereof, the other face of said carrier being shaped to provide a plurality of series of areas, adjacent areas of each series being spaced by at least one intermediate area of another series, the successive entire areas at said other face being in transversely offset relation, the areas of at least one of said series having the representations of spaced and successive picture portions of a respective picture thereon, each picture portion being substantially in the focus of a respective associated lenticulation.

7. A light-permeable picture carrier which has lenticulations at one face thereof, the other face of said carrier being shaped to provide a plurality of series of areas, adjacent areas of each series being spaced by at least one intermediate area of another series, the successive entire areas at said other face being in transversely offset relation, the areas of at least one of said series having the representations of spaced and successive picture portions of a respective picture thereon, each picture portion being substantially in the focus of a respective associated lenticulation, said areas being substantially planar.

8. A light-permeable picture carrier which has lenticulations at one face thereof, the other face of said carrier being shaped to provide a plurality of series of areas, adjacent areas of each series being spaced by at least one intermediate area of another series, the successive entire areas at said other face being in transversely offset relations, the areas of at least one of said series having the representations of spaced and successive picture portions of a respective picture thereon, each picture portion being substantially in the focus of a respective associated lenticulation, the size of each said area which has such representation being less than the size of the respective lenticulation.

9. A light-permeable picture carrier which has lenticulations at one face thereof, the other face of said carrier being shaped to provide a plurality of series of areas, adjacent areas of each series being spaced by at least one intermediate area of another series, the successive entire areas at said other face being in transversely offset relation, the areas of at least one of said series having the representations of spaced and successive picture portions of a respective picture thereon, each picture portion being substantially in the focus of a respective associated lenticulation, each said picture portion having an opaque reflecting backing.

10. A light permeable carrier which has a lenticulated face and an opposed face, said lenticulated face having a series of successive lenticulations, said opposed face having spaced ribs which are separated by intermediate transverse recesses, said ribs and said recesses being in continuous succession, each rib having an exposed relief face which is substantially in the focus of a respective lenticulation, said exposed faces having thereon the representations of the respective spaced picture areas of a picture, said depressions being free from the picture areas of said picture which are located between said respective spaced picture areas.

11. A carrier according to claim 10, said carrier having a straight longitudinal axis, said lenticulations being identical portions of identical cylinders which have parallel axes which are perpendicular to said longitudinal axes, each said exposed face being planar and being parallel to said longitudinal axes, each said exposed face being wholly transversely aligned with half the respective lenticulation, each said exposed face being thus alined, longitudinally at one side of the axis of the respective lenticulation.

LEO H. BROWN.